United States Patent [19]

Kühl

[11] Patent Number: 4,744,964

[45] Date of Patent: May 17, 1988

[54] METHOD OF PURIFYING PYROLYSIS GASES

[75] Inventor: Eberhard Kühl, Mainz, Fed. Rep. of Germany

[73] Assignee: Environment Protection Engineers, Incorporated, Southfield, Mich.

[21] Appl. No.: 761,776

[22] Filed: Aug. 2, 1985

[51] Int. Cl.$^4$ .................. C01B 17/16; C01B 31/20; C01B 7/00; B01J 8/00

[52] U.S. Cl. .................. 423/230; 423/240; 423/244; 55/300

[58] Field of Search ............. 423/242, 244, 240, 230; 55/300, 73

[56] References Cited

U.S. PATENT DOCUMENTS

| | | | |
|---|---|---|---|
| 3,090,180 | 5/1963 | Berz et al. | 55/300 |
| 4,010,014 | 3/1977 | Barnebey et al. | 55/300 |
| 4,061,476 | 12/1977 | Holter et al. | 423/244 |

*Primary Examiner*—Gregory A. Heller
*Attorney, Agent, or Firm*—Frost & Jacobs

[57] ABSTRACT

The invention relates to a method of purifying pyrolysis gases preferably containing hydrogen halides and/or acidic gaseous sulfur compounds by simultaneous neutralization and dust separation in which the gas entraining large amounts of dusty solid particles is led through a bulk bed for the purpose of binding the gaseous pollutants, and an apparatus for carrying out said method. The problem of clogging and plugging of the bulk bed is solved in that the grains of the bulk bed are set in shocklike movement and are thus subjected to a minimum wear by mechanical abrasion, the clogging of the bulk bed filter thus being avoided and the purification of the gas improved.

13 Claims, 2 Drawing Sheets

METHOD OF PURIFYING PYROLYSIS GASES

The invention relates to a method of purifying pyrolysis gases with simultaneous neutralization and dust separation in which the gas is mixed with a particulate neutralizing agent and led through a bulk bed of granular material resting on a gas and dust-permeable bottom, and an apparatus for carrying out this method comprising a means for introducing a particulate neutralizing agent into the pyrolysis gas flow, comprising a bulk bed of granular material which rests on a gas and dust-permeable bottom and through which the pyrolysis gas flow mixed with the particulate neutralizing agent flows, and at least one dedusting means following the bulk bed.

EP-OS 22 214 discloses a method of pyrolysis of waste materials in which by adding basic additives to the waste materials before and/or during the thermal decomposition acidic pollutants, in particular hydrogenhalides, hydrogen sulphide and sulfur dioxide, are absorptively bound and neutralized. However, a disadvantage here is that the absorption takes place in the gas phase, the poor efficiency requiring a very great excess of sorbent. As sorbent fine-grain basic materials are used, in particular lime hydrate, limestone, dolomite, calcium oxide, magnesium oxide, magnesium carbonate, magnesium hydroxide, basic sodium and potassium compounds, alumina, hematite, clay and the like. If in the known method basic pollutants or noxious substances are formed, in corresponding manner as sorbent and binder acidic additives such as acidic earths, for example montmorillonite and bentonites, are used. However, the excess of fine-grain additives necessary to bind and neutralize the gaseous pollutants leads to considerable difficulties as regards the dust discharge of the pyrolysis gases thus treated because the enormous amounts of dust accruing must be subsequently separated out again in accordance with the legal environmental regulations and this can only be done with great expenditure on apparatus and high energy consumption.

Moreover, in the known method the entire system is too sluggish to guarantee with the extremely varied composition of waste and refuse occurring in practice the required degree of binding and neutralization of the pollutants in each case with the necessary certainty.

It is also already known to lead the pyrolysis gases charged with pollutants and possibly sorptive additives through a bulk bed of continuously moved grains. The bulk bed grains may be inert with respect to the pollutant gases, for example consist of quartz gravel, but may also consist of the same basic or acidic materials which are used as additives for absorptive binding and neutralization of the pollutants.

The use of a bulk material bed increases the efficiency of the pyrolysis gas purification by increasing the collision number between the pollutant gas molecules and the sorbent and neutralization materials, but also presents additional problems.

If a conventional solid bed is used as bulk bed it becomes immediately clogged by the dusty component of the additives used and by the dust entrained by the pyrolysis gases from the start, quite apart from the risk of agglutination of the bulk bed grains by condensate arising on cooling of the gases. To avoid clogging of the bulk bed it has been proposed to move the grains of the bulk bed continuously for example with an agitator. However, the continuous movement of the grains has the disadvantage that said grains are continuously subjected to high shearing forces and this results in an extremely finely divided abrasion which increases the fine dust discharge with the pyrolysis gas from the overall system. The fine dust must be subsequently separated from the gas again and this is very difficult to do and involves high investment costs and energy consumption.

The abrasion of the bulk bed grains has however a further disadvantageous consequence, i.e. the screen bottom on which the bulk bed rests rapidly becomes clogged with small grains. For the continuous grain movement has the same effect as that which occurs in a ball mill: The size of the grains becomes increasingly smaller until it corresponds substantially to the diameter of the holes in the screen bottom.

The continous stirring of the grains of the bulk bed and the thereby resulting undulation movement on the surface of the bed leads finally to the disadvantage that always only a part of the bulk material height of the bed can be effectively used as filter.

Finally, the agitation requires a comparatively high force expenditure and thus involves high energy costs.

The invention is based on the problem of providing a method and an apparatus of the type mentioned at the beginning with which it is possible to avoid the disadvantages outlined and to optimize the relationship between the abrasion of the bulk bed grains and the dust discharge of the pyrolysis gas leaving the bulk bed and the cleaning and purifying effect of the bulk bed.

This problem is solved according to the invention in that the bulk bed is set in shocklike movement.

By a movement which is not continuous but impactlike or shocklike the bulk bed grains are preserved to a great extent, the abrasion and thus the formation of additional fine dust thereby being reduced to the absolutely necessary minimum. Nevertheless, the clogging and plugging of the bulk bed is avoided by the shocklike movement. The shock movement differs essentially from the movement resulting from agitation of the bed, which is very similar to the conditions in a ball mill. Even during the shock movement the entire bulk height of the bed remains effective over the entire cross-section of the reactor. Moreover, clogging of the holes of the bottom by bulk bed grains "ground" increasingly smaller is practically eliminated.

The shock frequency depends on the one hand on the desired minimizing of the dust discharge by the pyrolysis gas and on the other on the desired maximizing of the cleaning effect of the bulk bed.

Overall the fine dust discharge by the purified pyrolysis gas when using the method according to the invention is several times less because the disadvantageous grinding effect of the grains on each other cannot occur during the shocklike movement. The dust component entrained by the pyrolysis gas is therefore not ground to even smaller grain sizes as in the known method and consequently can be separated with less expenditure both when using known apparatuses and when using the apparatus according to the invention.

In an advantageous example of embodiment of the method according to the invention only the gas and dust-permeable bottom is subjected to the shocks or impacts and the shocklike movement thereof is transmitted to the bulk bed grains. This permits a further simplification of the necessary shock-generating means.

In another preferred example of embodiment of the method according to the invention instead of the gas and dust-permeable bottom fittings projecting into the interior of the bulk bed are subjected to the shocks and the shocklike movement of the fittings is transmitted to the bulk bed grains. The fittings may project from above or from the side into the interior of the bulk bed. Also, the two embodiments of the method according to the invention may be combined with each other so that both the gas and dust-permeable bottom and the fittings projecting into the interior of the bulk bed are subjected to impacts and the shocklike movement of the bottom and of the fittings is transmitted to the bulk bed grains.

The fittings projecting into the interior of the bulk bed may however also be parts of the gas and dust-permeable bottom, i.e. project into the interior of the bulk bed from below; this variant represents a further embodiment of the method according to the invention.

Preferably, the shocklike movement is generated with the aid of a vibration generator or a knocker. As vibration generator electromagnetic and mechanical vibration generators may be used. Preferred electromagnetic vibration generators are vibrators and electromagnetic sonic generators, and sonic generators operating like the known sonic screen apparatuses with sonic impact heads have proved particularly advantageous.

In a preferred further development of the method according to the invention as gas and dust-permeable bottom a screen bottom is used whose holes preferably widen in some manner, for example conically, towards the side remote from the bulk bed. The danger of clogging of the screen bottom with dust, abrasion or additive particles is thereby still further reduced.

As fittings projecting into the interior of the bulk bed preferably members of profiled circular rods of steel or another suitable material with which the expert is familiar are used. The profiled circular rods may have any suitable profile and assume any suitable relative position with respect to the bulk bed. Individual profile rods may be used but preferably a plurality of profiled circular rods are combined or connected together to form a rake, the rake then being subjected as a whole to the impacts and the shocklike movement of the rake transmitted to the bulk bed grains.

A particularly advantageous effect is obtained with an embodiment of the method according to the invention in which the rake subjected to the impacts and made up of the profiled circular rods is moved in the horizontal direction, i.e. transversely of the flow direction of the pyrolysis gas flow, preferably intermittently. This horizontal movement may be a linear reciprocation but can also be a rotational movement.

In the method according to the invention as bulk bed grains grains having a granulation of 1 to 12 mm, preferably 3 to 8 mm, are used. The bulk bed grains may be chemically inert, for example consist of quartz gravel, but may also be absorptiv ely and/or adsorptively acting grains and for example consist of the known sorbents referred to at the beginning.

In a further development of the method according to the invention the pyrolysis gas flow after leaving the screen bed, beneath the gas and dust-permeable bottom, is deflected in constrained manner to effect a preseparation of the coarser components of the dust content entrained by the gas stream. The dust component thus separated is carried off with the aid of known conveying means with which the expert is familiar and removed from the apparatus used for carrying out the method.

The pyrolysis gas is led preferably after the deflection of the gas flow through at least one dedusting means which in particularly preferred manner lies completely within the pyrolysis gas chamber. As dedusting means a known aerocyclone, preferably a multicyclone, can be used.

The apparatus according to the invention for carrying out the method described above is characterized by a shock-generating means with the aid of which the bulk bed grains can be set directly or indirectly into shocklike movement. As shock-generating means preferably a vibration generator or a knocker is used. Suitable vibration generators are electromagnetic vibration generators, for example vibrators, and sonic vibration generators, including ultrasonic generators and sonic generators operating with sonic impact heads. "Vibration generator" signifies however according to the invention only means which generate shock vibrations or shocklike vibrations.

The shock-generating means can be disposed both within the space traversed by the pyrolysis gas flow and outside the pyrolysis gas chamber. In particular when a sonic generator is used as shock-generating means the bulk bed grains can be set directly into shocklike movement without having to first set the gas and dust-bottom or the fittings projecting into the interior of the bulk bed into such a movement. Preferably, however, the bulk bed grains are set indirectly in shocklike movement, that is by first setting into shocklike movement either the bottom on which the bulk bed rests or the fittings projecting into the interior of the bulk bed, the movements thereof being transmitted to the bulk bed grains. In this latter method the bulk bed grains are set "indirectly" in shocklike movement.

Preferably, the gas and dust-permeable bottom is a screen bottom, the clogging of the holes of the screen bottom being particularly effectively avoided by holes widening in the direction of flow of the pyrolysis gas. The holes may be conically formed or have any other widening geometrical form.

In an advantageous embodiment of the apparatus according to the invention fittings projecting into the interior of the bulk bed are provided and can be set in shocklike movement with the aid of the impact-generating means. The fittings may consist of individual profiled circular rods but may also be combined to form a rake and connected together.

In a further embodiment of the apparatus according to the invention both the screen bottom and the fittings projecting into the interior of the bulk bed may be simultaneously provided and adapted to be set in shocklike movement by a single or various shock-generating means. However, generally it suffices either to set in shocklike movement the fittings or the gas and dust-permeable bottom. When a knocking mechanism is used as shock-generating means and not the bottom but the fittings projecting into the interior of the shocklike bed, for example a rake, are subjected to the impacts of the knocker, once again two variants of the method and apparatus according to the invention are possibly, i.e. a variant in which the bulk bed as a whole is stationary and a variant in which the bulk bed as a whole is movable, for example rotatably mounted.

Preferably, the apparatus comprises between the gas and dust-permeable bottom and the dedusting means a preseparator which can be constructed either as settling chamber or as impingement separator or in any other manner known to the expert. In each case the preseparator serves for sedimentation of the coarser components of the dust entrained by the pyrolysis gas so that the subsequent dedusting means is relieved and its efficacy increased.

In a particularly preferred embodiment of the apparatus according to the invention the dedusting means is disposed within the pyrolysis gas chamber. The dedusting means advantageously consists of one or more aerocyclones or an aeromulticyclone.

In the drawings two examples of embodiment of the apparatus according to the invention are illustrated diagramatically in section and the method according to the invention can also be explained in detail with the aid thereof:

Figure 1:
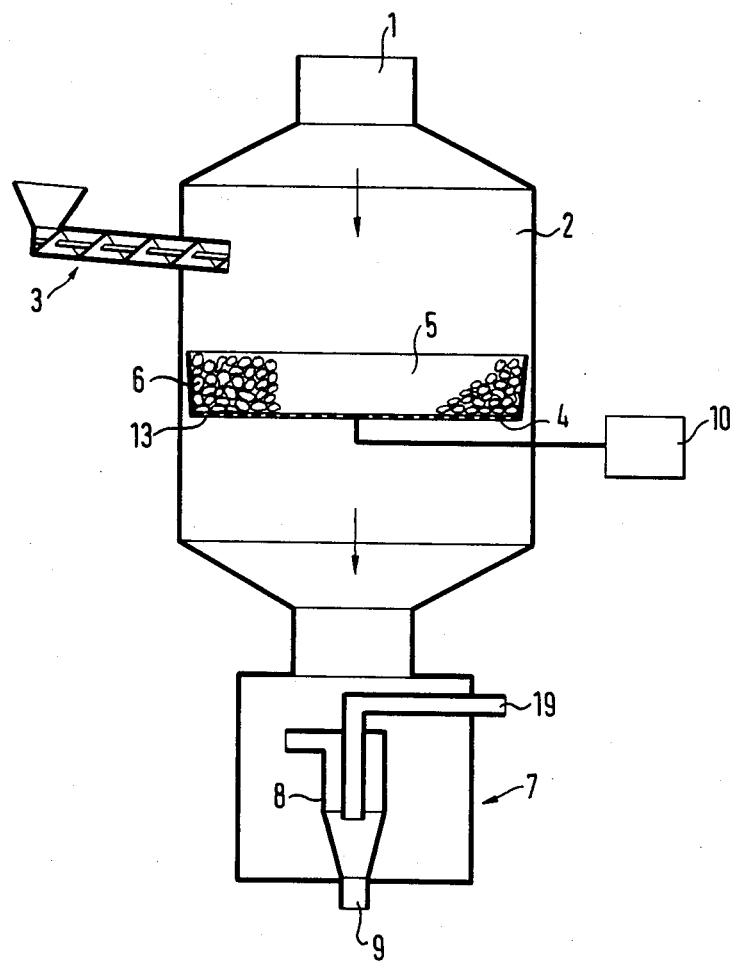
FIG. 1 is an embodiment without preseparator in which the gas and dust-permeable bottom can be set in shocklike movement.

The pyrolysis gases to be cleaned and coming from the pyrolysis reactor, for example a revolving drum reactor, flow through the gas inlet 1 into the mixing chamber which is part of the pyrolysis gas chamber, where they are mixed with a particulate neutralizing agent which is supplied continuously or discontinuously with a means 3 suitable for this purpose. The gas charged with particles of the neutralizing agent flows in the direction of the arrow through the bulk bed 5 resting on the screen bottom 4 and consisting of aborptively acting bulk bed grains, the size of said grains being greater than the smallest diameter of the holes 13 widening conically towards the side of the screen bottom 4 remote from the bulk bed 5.

The screen bottom 4 (FIG. 1) is set with the aid of an electromagnetic vibration generator 10 mechanically or acoustically in shocklike movement, the impact frequency being so regulated and controlled that firstly the dust discharge is minimized and secondly the absorption effect of the bulk bed is maximized. The shocklike movement of the screen bottom 4 is necessarily transmitted to the bulk bed grains 6.

After passing through the bulk bed 5 and the screen bottom 4 the dust-charged gas flows in the direction of the arrow into the dedusting means 7 which is arranged completely within the pyrolysis gas chamber and consists of the cyclone 8. The gas freed from the fine dust, which is discharged through the outlet 9, emerges through the outlet 19 and from there is supplied to the desired further use, i.e. for example is burnt to flue gas and used for indirect heating of a revolving drum reactor.

Figure 2:
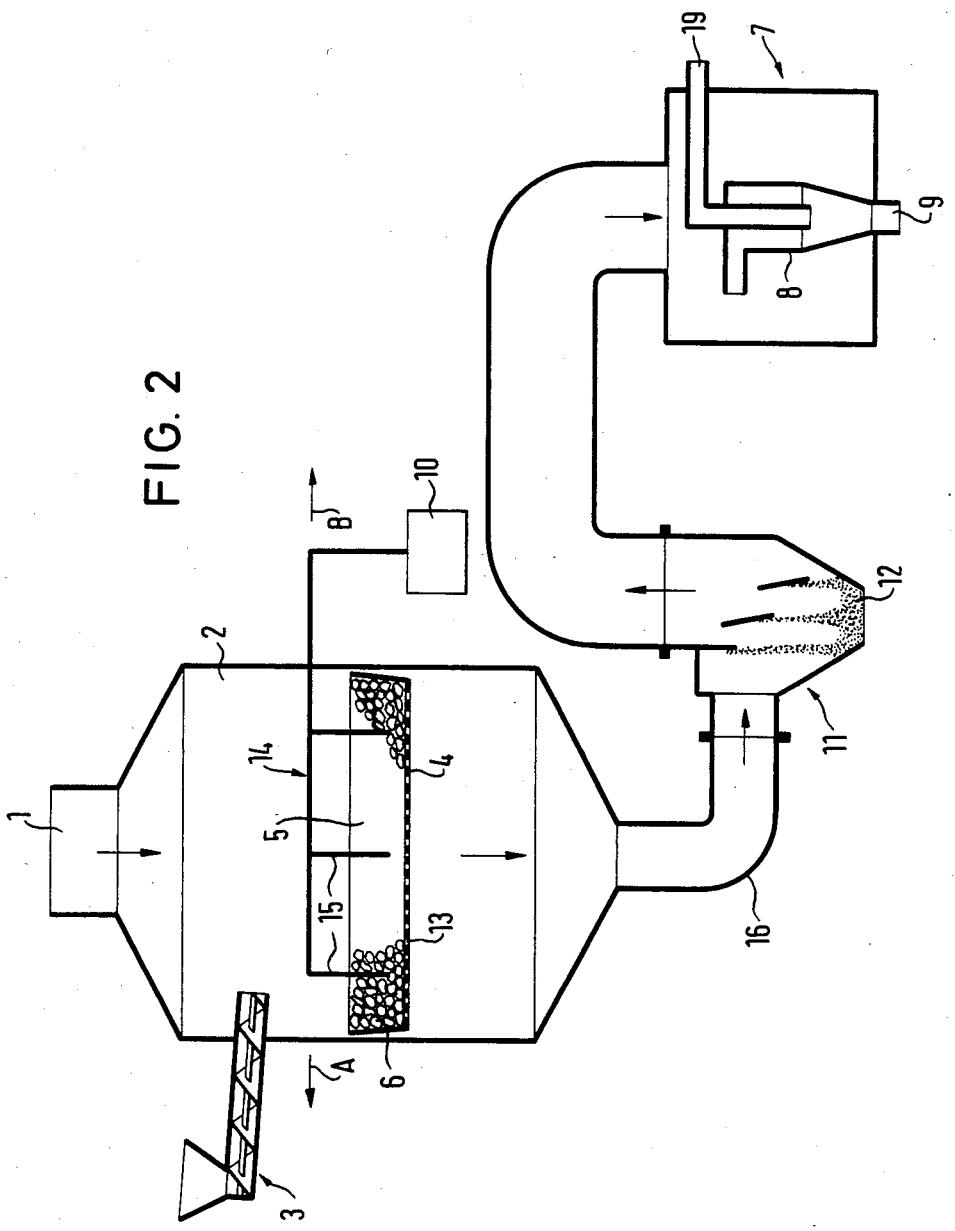
FIG. 2 is an embodiment with a preseparator in which fittings projecting into the interior of the bulk bed in the form of a rake can be set in shocklike movement.

In another embodiment (FIG. 2) fittings projecting into the interior of the bulk bed 5 are provided in the form of a rake 14 of profiled circular rods 15 which can be set by means of a vibrator 10 into shocklike movement and are simultaneously displaceable with the aid of a motor and a transmission (not shown) in the direction A⟵⟶B.

After passage through the bulk bed 5 and the stationary screen bottom 4 the dust-charged gas flows in the direction of the arrow, is deflected by the elbow 16 and then passes to the preseparator 11 constructed as impingement separator in which the gas is constrained to a further deflection. This leads to sedimentation of the coarser components 12 of the dust entrained by the gas and these are removed from the preseparator 11 by suitable conveying means (not illustrated) and carried away.

The gas precleaned in this manner then passes into the dedusting means 7 which is disposed completely within the pyrolysis gas chamber and which once again consists of the cyclone 8 with the fine dust outlet 9 and the gas outlet 19.

The invention is however not limited to the embodiments drawn: Thus, for example, two complete apparatuses with the features set forth in the claims or described above, connected in parallel, may be so arranged that with the aid of the second apparatus operations can be continued when the first apparatus has to be repaired, maintained or regenerated. Such a system can be operated in alternate manner without interruption.

I claim:

1. A continuous method of purifying acidic pyrolysis gases containing at least one of hydrogen halides, hydrogen sulfide and sulfur oxides with simultaneous neutralization and dust separation, in which the gas is mixed with a particulate basic neutralizing agent containing at least one of lime hydrate, limestone, dolomite, calcium oxide, magnesium oxide, magnesium carbonate, magnesium hydroxide, basic sodium compounds and basic potassium compounds, the mixture of gas and neutralizing agent is led continuously downwardly through a bulk bed of granular mineral material resting on a gas and dust-permeable bottom, the bulk bed is intermittently set in shocklike movement during said continuous method, and said mixture is continuously subjected to dust removal after passing through said gas and dust-permeable bottom.

2. Method according to claim 1 wherein said gas and dust-permeable bottom is subjected to impacts and the shocklike movement of the bottom is transmitted to the bulk bed grains.

3. Method according to claim 1, wherein fittings projecting into the interior of the bulk bed are subjected to impact and the shocklike movement of the fittings is transmitted to the bulk bed grains.

4. Method according to claim 1, wherein said shocklike movement is generated with the aid of one of a vibration generator and a knocker.

5. Method according to claim 4, wherein one of a vibrator and a sonic generator is used as said vibration generator.

6. Method according to claim 1, wherein a screen bottom is used as said gas and dust-permeable bottom.

7. Method according to claim 3, wherein said fittings projecting into the interior of the bulk bed include a rake comprising profiled circular rods.

8. Method according to claim 7, wherein said rake subjected to the impacts is simultaneously moved in a horizontal direction.

9. Method according to claim 1, wherein bulk bed grains are used having a granulation size ranging from 1 to 12 mm, preferably from 3 to 8 mm.

10. Method according to claim 1, wherein as bulk bed grains at least one of absorptively and adsorptively acting granular materials are used.

11. Method according to claim 1, wherein the pyrolysis gas flow after leaving the screen bed, beneath the gas and dust-permeable bottom, is subjected to a deflection.

12. Method according to claim 11, wherein after the deflection said mixture is continuously subjected to said dust removal within the pyrolysis gas chamber.

13. Method according to claim 12, wherein a cyclone is used for said dust removal.

* * * * *